May 28, 1968     C. R. HUGHES     3,385,607
COLLET AND WORKPIECE STOP DEVICE
Filed Feb. 11, 1966
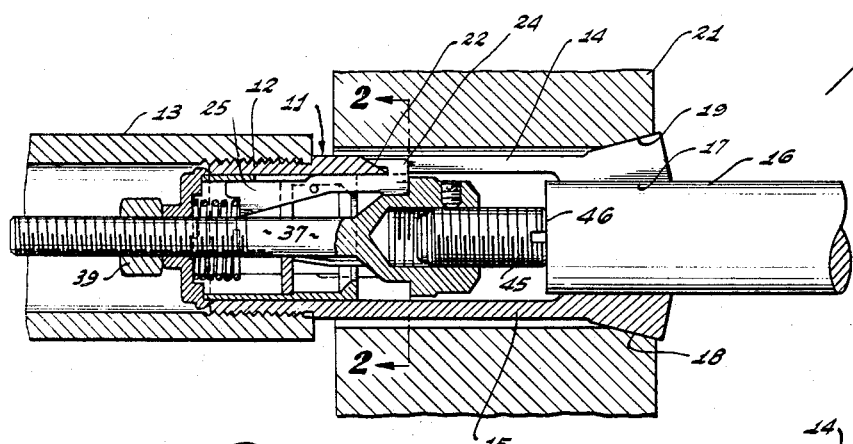
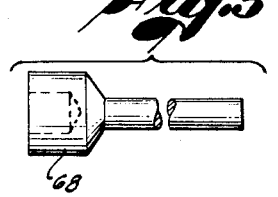
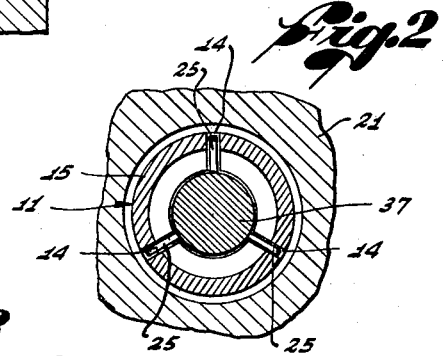
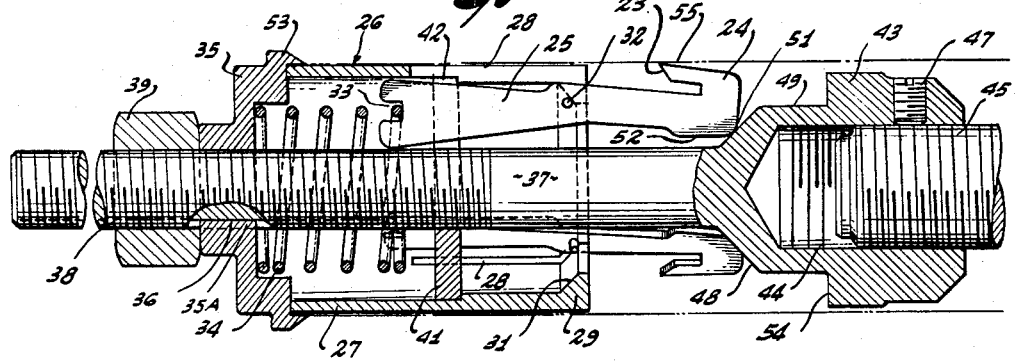
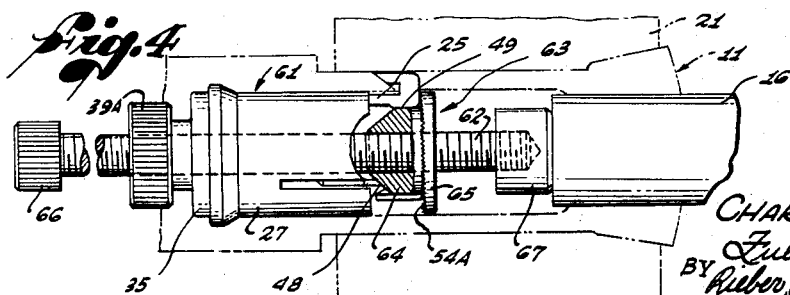
INVENTOR.
CHARLES R. HUGHES
BY Fulwider, Patton,
Rieber, Lee, and Utecht
ATTORNEYS United States Patent Office 3,385,607
Patented May 28, 1968

3,385,607
COLLET AND WORKPIECE STOP DEVICE
Charles R. Hughes, 308 Vista Baya,
Costa Mesa, Calif. 92627
Filed Feb. 11, 1966, Ser. No. 526,770
20 Claims. (Cl. 279—51)

The present invention relates generally to collets for holding workpieces in machine tools and more particularly to a collet and a work locating device therefor constituting an axial or longitudinal stop for work inserted and held in the collet.

In holding a workpiece in a collet in a machine tool, the amount of the workpiece which is disposed within the collet may or may not be critical depending upon the nature of the workpiece and the work to be performed thereon. Where the collet is used in operations where the axial or longitudinal positioning of the workpiece within the collet is not critical, it is obviously more economical to use a plain collet without a workpiece stop and for this reason the stop device, according to the present invention, is not only adjustable longitudinally to permit an adjustment in the amount of the work piece inserted into the collet, but also the entire stop device is preferably removable from the collet, so that the same collet may be used with or without the workpiece stop therein.

This will reduce the cost of the collet in operations not requiring or not permitting a longitudinal workpiece stop and will also permit a standard stop device to be associated with any desired collet so that a standard open collet may be readily converted to regulate the amount of the workpiece inserted therein by the simple assembly of a stop device in the collet. Thereby, the design of the collet can be standardized and only a sufficient number of stop devices provided to convert those collets wherein regulations of the workpiece insertion is required. The assembly and disassembly of a stop device with a collet is desirably a simple operation requiring a minimum of times.

It is therefore an object of the present invention to provide an improved collet for holding a workpiece, including a readily assembled and disassembled stop device to limit the distance the workpiece is inserted in the collet.

Another object of this invention is the provision of improved adjustable stop means limiting the axial positioning of a work piece in a collet, including clamping means interlocking with edges defining the ends of longitudinal slots in the collet.

A further object of this invention is the provision of an improved collet having stop means for a workpiece inserted in the collet with interlocking means thereon insertable into longitudinal slots in the collet to engage the rear edges defining the slots, and in which the interlocking means are moved out of the collet slots to permit ready assembly and disassembly of the stop means with the collet.

A still further object of the present invention is a stop means for a collet in accordance with the immediately preceding object including a stop element at the forward end of said stop means adjustable longitudinally thereof to vary the amount a workpiece may be inserted into the collet.

These and other objects and features of the invention will be readily apparent to those skilled in the art from the following specification and the appended drawing in which:

FIGURE 1 is a longitudinal sectional view of a draw collet and workpiece stop combination according to the present invention with the collet mounted in a machine tool and supporting a work piece;

FIGURE 2 is a transverse sectional view on the line 2—2 of FIGURE 1;

FIGURE 3 is a longitudinal sectional view through the stop device alone, with its parts positioned for insertion into and withdrawal from the collet;

FIGURE 4 is a longitudinal view, with parts broken away and sectioned, of a modified form of workpiece stop according to the present invention with the collet and machine tool indicated in phantom; and FIGURE 5 is a side elevational view of a longer stop element to be associated with the workpiece stop of FIGURE 4.

The collet at 11 in FIGURE 1 is of generally tubular construction, having a continuous rear supporting portion 12 exteriorly threaded to be received and mounted in a supporting means, such as a draw bar 13. The forward end of the collet 11 is slotted at 14 with three or more slots to provide segments 15 which may be moved inwardly to clamp a workpiece 16 therebetween at their surfaces 17. The forward ends of the segments 15 are thickened to provide exterior frusto-conical surfaces 18 which are engaged by a complementary internal frusto-conical surface 19 on a spindle 21 to force the segments 15 into clamping engagement with a workpiece 16 as the collet is drawn rearwardly by the draw bar 13.

The rear edges defining the slots 14 are optionally of substantially knife-edge type at 22 to be engaged by complementary inclined surfaces or abutments 23 on the free legs of optionally hook-like clamping ends 24 on movable interlocking members 25 mounted in a stop device generally indicated at 26. The device 26 includes a generally cylindrical body portion 27 having slots 28 in its forward end, into which the interlocking members 25 are projected. The clamping ends 24 may obviously have simple projecting lugs or the like to cooperate with complementary collet slot edges.

The forward edge of the cylindrical body portion 27 has an inwardly directed flange 29 provided with an internal inclined cam surface 31. The internal flange surface 31 is inclined inwardly and forwardly and is engaged by pins 32 extending transversely through the members 25 and engaging the surface 31 at opposite sides of the slots 28.

The bottom edges of the interlocking members 25 are notched at 33 to receive the upper coil of a generally spiral compression spring 34, disposed within the rear portion of the cylindrical body portion 27 against an end cap 35, rigidly secured to the rear end of the cylindrical body portion 27. The members 25 are thereby biased forwardly of the stop device and pivot about their engagement with the spring coil.

The cap 35 has a central bore therethrough, through which freely slides a rod-like operating member 37 threaded at its rear end 38 to receive a clamping nut 39. The rear end 38 of the operating member 37 is longitudinally slotted at 36 to receive a complementary internal projection 35A in the bore through cap 35 to prevent rotation of the operating member relative to the cap and the body portion 27 while providing for relative longitudinal movement thereof. The cap 35 has a flange 53 therearound having a forwardly inclined surface engaging a complementary surface at the rear end of the collet 11 to be clamped thereagainst. An annular plate 41 mounted interiorly of the cylindrical body portion 26 has radial slots 42 therethrough to receive and guide the rear ends of the interlocking members 25. The plate 41 is provided with a central hole through which the operating member 38 freely slides.

The forward end of the operating member 37 is provided with a generally cup-shaped head 43 integral therewith and internally threaded at 44 to adjustably mount a stop element 45. The element 45 may be threaded into the head 43 varying amounts to determine the position of the forward surface 46 thereon which is engaged by the back surface of the workpiece 16 to limit the insertion of the work piece into the collet 11. A set screw 47 engages the stop element 45 to maintain it in adjusted position against involuntary movement.

The rear of the operator head 43 is provided with a frusto-conical surface 48 terminating rearwardly at the rod surface of the operating member 37 and forwardly in a side surface 49 on the head 43. The frusto-conical surface 48 engages the forward inner corners 51 of the interlocking members 25 to move the hook ends 24 thereof outwardly and into the collet slots 14. In the fully retracted position of the operating member 37 shown in FIGURE 1, the interlocking members 25 are maintained in their outward positions by engagement of their forward inner edges 52 against the side surface 49 of the head 43.

As shown in FIGURE 1, the operating member 37 has been drawn to its rearmost position by the nut 39 and the stop device 26 is clamped between the engagement of the flange 53 with the back end of the collet 11 and the engagement of the three end surfaces 23 on the hook ends 24 of the interlocking members 25 with the surfaces on the knife edges 22 defining the interior ends of the slots 14. An abutment surface 54 on the head 43 engages the forward edges of the interlocking members 25 to force the end surfaces 23 on the hooks on the interlocking members 25 solidly against the surfaces on the knife edges 22.

In the assembled position of FIGURE 1, the spring 34 has been further compressed by longitudinal rearward movement of the interlocking members 25 which have also rotated about the engagement of the top coil of the spring in the notches 33. The stop device is thus rigidly mounted in assembled position within the collet 11 and the stop surface 46 on the element 45 is positioned to limit inward movement of the work piece 16 to that desired.

If it is desired that the workpiece be moved inwardly of the collet further than the space provided in front of the head 43, or if the stop device is desired for use within another collet, it may be removed from the collet 11 in the following manner:

The collet is first removed from the spindle 21 and the draw bar 13 by moving the draw bar forwardly and unthreading the collet therefrom. This gives access to the nut 39 which is now backed off and the operating member 37 moved forwardly into the position of FIGURE 3.

The forward movement of the head 43 permits the interlocking members 25 to move forwardly under the bias of the spring 34 to unlock their hook ends from the collet slot knife edges. As the operating member continues to move forwardly, surfaces 48 and 49 of the head 43 release the interlocking members 25 and when the pins 32 engage the inclined frusto-conical surface 31 on the flange 29, further outward movement of the interlocking members 25 is accompanied by inward retraction of their hook ends 24 as the pins 32 ride inwardly of the surface 31, the members 25 pivoting about the engagement of the forward coil of spring 34 in the notches 33. When the free legs of the end hooks 24 clear the projected outside surface 55 of the body portion 27, the hook leg is entirely out of the slots 14 in the collet and the entire stop device may be freely withdrawn out of the collet.

To insert the stop device into the same or a similar collet, the action is reversed with the stop device 26 inserted into the collet bore from the rear, the interlocking members 25 aligned with the slots 14, and the operating member 37 moved rearwardly by hand or by rotation of the nut 39 to project the hook ends 24 into the slots 14. Continued rotation of the nut 39 against the cap 35 draws member 37 and its head 43 rearwardly with the abutment surface 54 engaging the interlocking members 25 and forcing surfaces 23 into solid locking engagement with the knife edges 22 defining the rear ends of the slots 14 in the collet.

In their movements laterally of the collet the forward ends of the interlocking members 25 are automatically moved inwardly by the pins 32 riding on the inclined surface 31 as the members move forwardly under the bias of the spring 34. The forward, hook ends of the interlocking members 25 are moved positively outwardly into the collet slots 14 by their corners 51 riding on the frusto-conical surface 48 of head 43 as operating member 37 is moved rearwardly, are then held in the slots by the head surface 49 and are positively clamped against the collet slots knife edges by the abutment 54 on the head 43.

In the embodiment of the present invention illustrated in FIGURE 4, parts which are like those in FIGURES 1–3 have been given the same reference numerals, and unless otherwise described herein, the other parts of the workpiece stop device are the same as previously shown and described. The stop device of this embodiment is generally indicated at 61 and includes the same body portion 27 as that previously described, including the slots 28, the flange 29 and the inclined frusto-conical surface 31. It contains the internal annular plate or washer 41 and the compression spring 34 engaged by the notched rear ends of the interlocking members 25. The end cap 35 likewise has the same construction.

In this embodiment, the head 43 and integral operating member 37 are redesigned and separated in the following manner: The operating member now constitutes a screw 62 which is threaded in a central bore through a head 63. The head 63 has a body 64 which includes the inclined frusto-conical surface 48 and a side surface 49 as in the first embodiment. The head 63 has a forward annular flange 65 providing an under abutment surface 54a, which may or may not be serrated to inhibit rotation of the head, and which engages the forward ends of the interlocking members 25 as did the abutment surface 54 in the first embodiment. The operating screw 62 has an integral manual knob 66 on its rear end and a manual locking nut 39a thereon performs the function of the locking nut 39 in the first embodiment.

A stop element 67 is solidly threaded onto the end of the screw 62 to stop, at its forward face, the rear face of the workpiece 16. Adjustment of the position of the stop element 67 forwardly and rearwardly may in this embodiment be effected after the workpiece stop device is assembled within the collet 11, whereas in the first embodiment the position of the stop piece 45 will ordinarily be adjusted relative to the stop device before insertion of the stop device in the collet.

The operation of the embodiment of FIGURE 4 is similar to that previously described in that with the lock nut 39a backed off away from the end cap 35, from the position of FIGURE 4, the screw 62 and the head 63 thereon may be moved bodily as a unit axially forwardly, with the interlocking members 25 moving forwardly therewith until their crosspins 32 engage the inclined surfaces 31. Thereafter, as a frusto-conical surface 48 is presented to the ends of the interlocking members 25, they move inwardly as their pins ride up the inclined surfaces 31 into the position of FIGURE 3, whereupon the stop device may be bodily removed rearwardly of the collet.

In insertion in both embodiments, the stop device is moved into the collet and is rotated until the interlocking members 25 align with the slots 14 in the collet. If, after insertion of the stop device, its operator 37 or 62 is pulled rearwardly relative to the body portion 27 to move the interlocking members 25 rearwardly, the spring 34 will bias the interlocking members 25 outwardly and if the workpiece device is thereafter rotated the interlocking members 25 will automatically snap into the collet slots without requiring alignment therewith by sighting.

With the interlocking members 25 within the slots 14 in the embodiment of FIGURE 4, the operating screw 62 may be pulled fully to the rear, into the position shown in FIGURE 4, and then turned to rotate it relative to the head 64 which remains stationary by the frictional engagement of its abutting surface 54a with the forward ends of the interlocking members 25. This moves the screw 62 forwardly or rearwardly relative to the stop device 61 and the collet 11 to position the stop face of the element 67 in the desired position within the collet. After the stop element position is adjusted the locking nut 39a is tightened and the combination is complete, as in FIGURE 4.

Where the length of the screw 62 does not permit sufficient forward movement of the stop element 65, a longer stop element 68 may be positioned thereon, as shown in FIGURE 5, by readily unthreading the element 67 and substituting the element 68 therefor. Other stop elements may likewise be used with either stop device, for example, spring loaded and automatically ejecting stop elements and the like.

It will be understood that the serrations 54a are optional since the normal friction between a smooth abutment surface 54a and the ends of the interlocking elements 25 will prevent rotation of the head 64. Alternatively, the head 64 may be made non-cylindrical on the surface 49 and engage a complementary opening into the body portion 27 to prevent rotation of the head 64.

While certain preferred embodiments of the invention have been specifically illustrated and described it will be understood that the invention is not limited thereto as many variations will be apparent to those skilled in the art and the invention is to be given its broadest interpretation within the terms of the following claims.

I claim:

1. A collet for clamping a workpiece internally thereof comprising: a substantially tubular member having longitudinally extending slots in its forward portion defining laterally movable segments; internal clamping surfaces adjacent the forward ends of said segments whereby a workpiece inserted in the collet may be clamped therein by lateral inward movement of the segments; means at the back end of said collet for mounting it; a stop device for limiting the insertion of a workpiece into the collet, said stop device being readily assembled and disassembled with the collet from the rear thereof and including a body portion insertable within the collet having means thereon engageable with the collet to limit the insertion of the stop device therein; interlocking means in said body portion movable longitudinally and laterally thereof and biased forwardly thereof, said interlocking means being spaced circumferentially of said body portion so as to align with the slots in the collet; operating means extending axially through said stop device to be accessible at the rear thereof, means providing a stop surface at the forward end of said operating means; and means on said operating means responsive to rearward movement thereof for moving said interlocking means into said collet slots and longitudinally into clamping engagement with the edges defining the rear ends of the slots to rigidly mount said stop device within the collet; and means for holding said operating means in its rearward position to maintain said clamping and mounting action.

2. The collet defined in claim 1 including interengaging means on said interlocking means and said body portion for effecting inward movement of said interlocking means upon forward movement of the interlocking means under the bias thereon in response to forward movement of said operating means whereby said interlocking means are withdrawn from said collet slots to provide for withdrawal of the stop device from the collet.

3. The collet defined in claim 1 in which the operating means includes a head adjacent its forward end providing an outwardly inclined surface for moving the forward ends of said interlocking means outwardly into the collet slots and an abutment surface thereafter engaging the ends of said interlocking means and forcing them into clamping engagement with the edges defining the ends of the collet slots as said operating means is moved rearwardly of the stop device.

4. The collet defined in claim 1 in which said stop surface is located at the forward end of a stop element adjustably mounted on the forward end of said operating means.

5. A collet as defined in claim 1 in which the forward ends of said interlocking means are of substantially hook shape and the edges defining the ends of the collet slots and the ends of the free legs of said hooks are complementary to provide interlocking between the hooks and the edges without substantial projection of the interlocking means beyond the outer periphery of the collet.

6. A collet as defined in claim 1 in which said interlocking means have notches in their rear edges engaging with the forward coil of a spring supplying the forward bias thereto, said interlocking means pivoting about said engagement in the movements of their forward ends into and out of the collet slots.

7. A collet as defined in claim 2 in which said interengaging means for producing inward movement of the interlocking means comprises inclined internal surfaces on said stop device body portion and transverse elements on said interlocking means, said elements riding up said inclined surfaces to move the forward ends of the interlocking means inwardly as the interlocking means move forwardly relative to said body portion.

8. A collet as defined in claim 1 in which said operating means comprises: screw means extending axially through the stop device to be accessible at the rear thereof; and a head threaded on said screw means and providing said means responsive to rearward movement of the operating means for moving the interlocking means, whereby rotation of said screw means effects axial movement thereof relative to said head to adjust the position of said stop surface in the collet.

9. The collet defined in claim 3 in which said operating means further includes a screw extending through and threaded in said head and extending beyond said body portion rearwardly thereof for manipulation of said head and screw.

10. A readily assembled and disassembled stop device for limiting the internal movement of a workpiece relative to a clamping collet comprising: a holder; interlocking means disposed with their rear portions within said holder; clamping forward ends on said interlocking means extending outwardly of said holder; means in said holder biasing said interlocking means forwardly thereof; operating means extending substantially axially through said holder; a nut threaded on the rear extended portion of said operating means, said operating means engaging the forward ends of said interlocking means to limit their inward movement; interengaging means on said holder and on said interlocking means for effecting inward movement of the forward ends of said interlocking means upon forward movement thereof under their bias, said interengaging means also limiting the forward movement of said interlocking means to retain them in said holder; and means on said operating means engaging the forward ends of said interlocking means to move them outwardly and rearwardly into clamping position when the operating means is moved rearwardly relative to said holder.

11. A workpiece stop device as defined in claim 10 in which said operating means includes an outwardly inclined surface adjacent its forward end which engages the forward ends of said interlocking means to effect outward movement thereof; and an abutment surface on said operating means engaging the ends of said interlocking means to move them rearwardly into clamping position.

12. The workpiece interengaging stop device defined in claim 10 in which said means comprise: an inclined, rearwardly facing surface on said holder; and means mounted on said interlocking means and extending transversely thereof and engageable with said inclined surface to effect inward movement of said interlocking means as they move forwardly under the bias thereon in response to forward movement of said operating means.

13. The workpiece stop device defined in claim 10 in which said biasing means is a spring disposed rearwardly of said interlocking means and in which the rear edges of said interlocking means have notches engaging the front coil of the spring to provide pivot points for the movements of the forward ends of the interlocking means.

14. The workpiece stop device defined in claim 10 in which said operating means includes a screw and an operating head threaded thereon, in which said screw extends rearwardly of said holder for manipulation and forwardly of said head to support a stop surface, said head carrying said means engaging the forward ends of said interlocking means to move them.

15. The workpiece stop device defined in claim 11 in which said inclined and abutment surfaces are mounted on a head part of said operating means, said operating means further including a stem part in the form of a screw threaded in and extending through said head part, said stem part providing a manipulating end rearwardly of the holder and supporting a stop surface forwardly of the holder, whereby rotation of said stem part relative to said head part adjusts the position of the stop surface relative to the holder.

16. For use in a draw collet of the type having a tubular body with a plurality of longitudinal slots through the wall of said body and terminating short of the rearward end thereof to divide said body into a plurality of jaws laterally movable to grip a workpiece adjacent the forward ends thereof, a workpiece stop device comprising in combination:
  (a) a holder adapted to be inserted into the bore of said collet from the rear;
  (b) at least one interlocking member mounted on said holder for reciprocal transverse movement thereon between extended and retracted positions and having a portion adapted when in extended position to project outwardly from said bore into one of said slots and said portion having a rear abutment adapted to engage the rear end of said slot and limit rearward axial movement of said member when it is in extended position and to be disengaged from said slot end when said member is in retracted position to permit withdrawal thereof from said bore;
  (c) operating means operatively engaged with said member and operable from outside said collet to move said member selectively between said extended and retracted positions as aforesaid; and
  (d) stop means including a forwardly facing abutment formed on said member to longitudinally position a workpiece gripped by said collet and positively prevent rearward motion thereof with respect to said collet when said member is in extended position.

17. The device defined in claim 16 further characterized by having a plurality of said interlocking members, one for each collet slot all mounted on said holder in like manner and operatively engaged with said operating means to effect said selective movement thereof in unison.

18. The device defined in claim 16 further characterized in that said stop means includes:
  (a) a stop member with a forward facing abutment positioned to be engaged by a workpiece gripped by said collet; and
  (b) adjutable means interposed between said stop member and the interlocking member adapted to vary the longitudinal displacement of said stop member with respect to said slot end to vary the longitudinal location of such work piece in said collet when gripped thereby.

19. The device defined in claim 16 further characterized by having a yieldable spring interengaged between said holder and interlocking member and biased to urge the latter to retracted position.

20. The device defined in claim 19 further characterized by having a cam surface on said operating means engageable with said interlocking member upon relative longitudinal movement of said surface and member to move the latter against the urging of said spring and into said extended position.

References Cited
UNITED STATES PATENTS

| | | | |
|---|---|---|---|
| 2,396,504 | 3/1946 | Grey | 279—46 |
| 2,423,551 | 7/1947 | Caffin | 279—46 |
| 2,469,160 | 5/1949 | Evans | 279—51 |
| 2,502,719 | 4/1950 | Haley et al. | 279—46 |
| 3,041,078 | 6/1962 | Lawall et al. | 279—51 |

OTHELL M. SIMPSON, *Primary Examiner.*

J. C. PETERS, *Assistant Examiner.*